United States Patent
Umeda

(10) Patent No.: US 8,537,413 B2
(45) Date of Patent: Sep. 17, 2013

(54) IMAGE PROCESSING APPARATUS, IMAGE PROCESSING METHOD, AND COMPUTER-READABLE STORAGE MEDIUM

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 12/819,996

(22) Filed: Jun. 21, 2010

(65) Prior Publication Data

US 2010/0328686 A1 Dec. 30, 2010

(30) Foreign Application Priority Data

Jun. 26, 2009 (JP) ................................ 2009-152626

(51) Int. Cl.
*G06F 15/00* (2006.01)
*H04N 5/225* (2006.01)
(52) U.S. Cl.
USPC ........................................ 358/1.2; 348/207.2
(58) Field of Classification Search
USPC ........................................................ 358/1.2
See application file for complete search history.

(56) References Cited

U.S. PATENT DOCUMENTS

2001/0013894 A1* 8/2001 Parulski et al. ............... 348/207
2002/0006230 A1* 1/2002 Enomoto ...................... 382/261

FOREIGN PATENT DOCUMENTS

JP 2001-298619 A 10/2001
JP 3233114 B2 11/2001

* cited by examiner

*Primary Examiner* — Saeid Ebrahimi Dehkordy
(74) *Attorney, Agent, or Firm* — Carter, DeLuca, Farrell & Schmidt LLP

(57) ABSTRACT

When printing by generating a composite low-frequency image based on an input image, performing dodging processing, and changing a size of the input image to an output image size, if the output image size is much smaller than the input image size, wastefulness occurs in the composite processing of the low-frequency image, and the overall performance of the printing process deteriorates. To solve these problems, a plurality of blurry images having a different blurriness level from an input image are generated, print setting information to be used in printing of the input image is input, a size of a composite low-frequency image is calculated based on the print setting information, a composite low-frequency image is generated in the calculated size from the plurality of blurry images, and dodging processing is performed on the input image using the generated composite low-frequency image.

10 Claims, 18 Drawing Sheets

| PRINT QUALITY | SPEED PRIORITY | STANDARD | IMAGE QUALITY PRIORITY |
|---|---|---|---|
| ENLARGEMENT RATE | 0.5 | 0.75 | 1 |

| PRINT QUALITY | PLAIN PAPER | MATTE PAPER | PHOTOGRAPHIC PAPER |
|---|---|---|---|
| ENLARGEMENT RATE | 0.5 | 0.75 | 1 |

1301

IMAGE PROCESSING APPARATUS, IMAGE PROCESSING METHOD, AND COMPUTER-READABLE STORAGE MEDIUM

BACKGROUND OF THE INVENTION

1. Field of the Invention

The present invention relates to an image processing apparatus, an image processing method, and a computer-readable storage medium for correcting the brightness of image data.

2. Description of the Related Art

Conventionally, many apparatuses and methods have been proposed for printing a preferred photographic image by performing various kinds of correction on photographic image data captured by a digital camera. These image correction methods can be broadly classified into two types, uniform correction in which uniform correction is performed on the whole image, and local correction in which a correction amount varies based on the local properties of the image. A representative example of local correction is exposure dodging correction.

Dodging correction is, for example, when an object, such as a person, is dark and the background is bright, the luminosity of the dark person area is greatly increased, and the brightness of the bright background area is not changed very much. Consequently, background overexposure is suppressed, and the brightness of the person area is appropriately corrected.

Examples of such a dodging process are discussed in Japanese Patent Application Laid-Open No. 2001-298619 and Japanese Patent No. 3233114. Both Japanese Patent Application Laid-Open No. 2001-298619 and Japanese Patent No. 3233114 realize dodging correction of a digital image by performing filter processing on an input image to generate a low-frequency image, i.e., a blurry image, and using this blurry image as a brightness control factor.

Further, an example of a characteristic common to Japanese Patent Application Laid-Open No. 2001-298619 and Japanese Patent No. 3233114 is the feature of compositing a plurality of blurry images (low-frequency images) having different blurriness levels, and performing dodging processing using this composite low-frequency image. By compositing a plurality of blurry images having different blurriness levels, a composite blurry image, which stores a certain amount of border edges between the object and the background, can be generated. If dodging processing is performed on the input image using low-frequency images having one type of blurriness level, a fixed width false contour is produced on the periphery of the object. Therefore, a composite low-frequency image is used for dodging processing.

When performing dodging processing using the composite low-frequency image like that described above, there are the following problems. For example, when printing an image having an input image size of width 3,000×height 4,500 pixels at 300 dpi on a four-inch wide, six-inch high sheet of printing paper, the required output image size is 1,200×1,800 pixels.

In this case, if the dodging processing is performed on the output image using a composite low-frequency image having the same size as the input image, which is generated by performing filtering processing on the whole input image, the generated composite low-frequency image will have 6.25 times the number of pixels than the size of the output image. Thus, wastefulness occurs in the filtering processing and the composite processing. Needless to say, if the printing paper has a smaller size, such as an L size or a business card size, the difference between the composite low-frequency image and the output image sizes will increase still further.

This wastefulness of the processing can be ignored for recent personal computers, which have very high CPU capabilities and memory access speed. However, for hardware that can only hold a very limited calculation capability, such as a low-cost inkjet printer, or a large-scale print system that requires a printing capability of several hundred sheets per minute, this processing wastefulness can be a factor that reduces overall performance.

For this reason, when performing dodging processing on an input image by generating a composite low-frequency image, it is desirable to composite low-frequency images having required resolution by considering the printing application, such as what size of paper the printing will be carried out on. Although generating low-frequency images having the required resolution to allow the calculation amount of the composite low-frequency image to be suppressed is preferable from perspective of a processing speed, such a technique has not been proposed.

SUMMARY OF THE INVENTION

The present invention is directed to an image processing apparatus and an image processing method capable of generating a composite low-frequency image using the minimum necessary calculation amount based on print setting information when performing dodging processing on image data.

According to an aspect of the present invention, an image processing apparatus includes a blurry image generation unit configured to generate a plurality of blurry images having a different blurriness level from an input image, an input unit configured to input print setting information to be used in printing of the input image, a calculation unit configured to calculate a size of a composite low-frequency image formed by compositing the plurality of blurry images based on the print setting information, a generation unit configured to generate a composite low-frequency image in the calculated size from the plurality of blurry images, and a processing unit configured to perform dodging processing on the input image using the generated composite low-frequency image.

According to the present invention, to perform dodging processing using a composite low-frequency image having a size calculated based on print setting information, the composite low-frequency image is generated having the minimum necessary size, so that the calculation processing amount for generating the composite low-frequency image can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a table illustrating an enlargement rate of a composite low-frequency image size based on paper type.

DESCRIPTION OF THE EMBODIMENTS

Various exemplary embodiments, features, and aspects of the invention will be described in detail below with reference to the drawings.

The following description is based on an assumption that image processing is performed in a printer main unit. However, this description merely illustrates an example of one exemplary embodiment. The present invention is not limited to the following exemplary embodiment.

Figure 2:
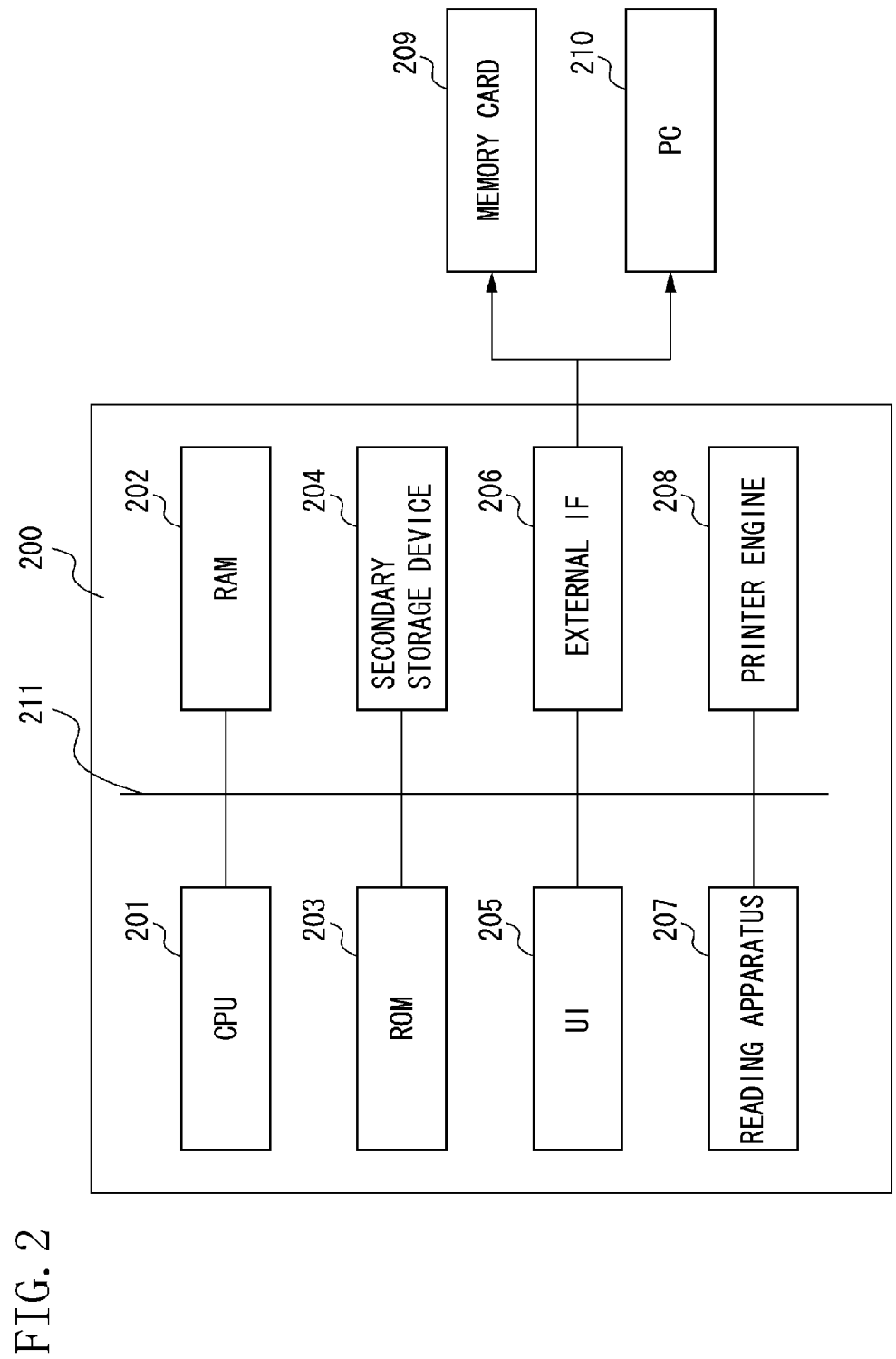
FIG. 2 is a block diagram illustrating a hardware configuration according to the first exemplary embodiment.

FIG. 2 illustrates an example of a hardware configuration of a printer 200 capable of executing the image processing according to the present exemplary embodiment. The hardware configuration 200 includes a CPU 201, a read-only memory (ROM) 203 storing the programs and tables for executing the various flowcharts described below, a random access memory (RAM) 202, and a secondary storage device 204 such as a hard disk, a flash memory and the like.

The printer 200 also includes a UI 205 including a display device such as a button, a liquid crystal display, and the like, an external interface 206 such as a universal serial bus (USB™) or a memory card reader, a document reading apparatus 207 such as a scanner, and a printer engine 208. The printer 200 reads image data from a memory card 209, and is connected to another computer 210 via the external interface 206.

Figure 1:
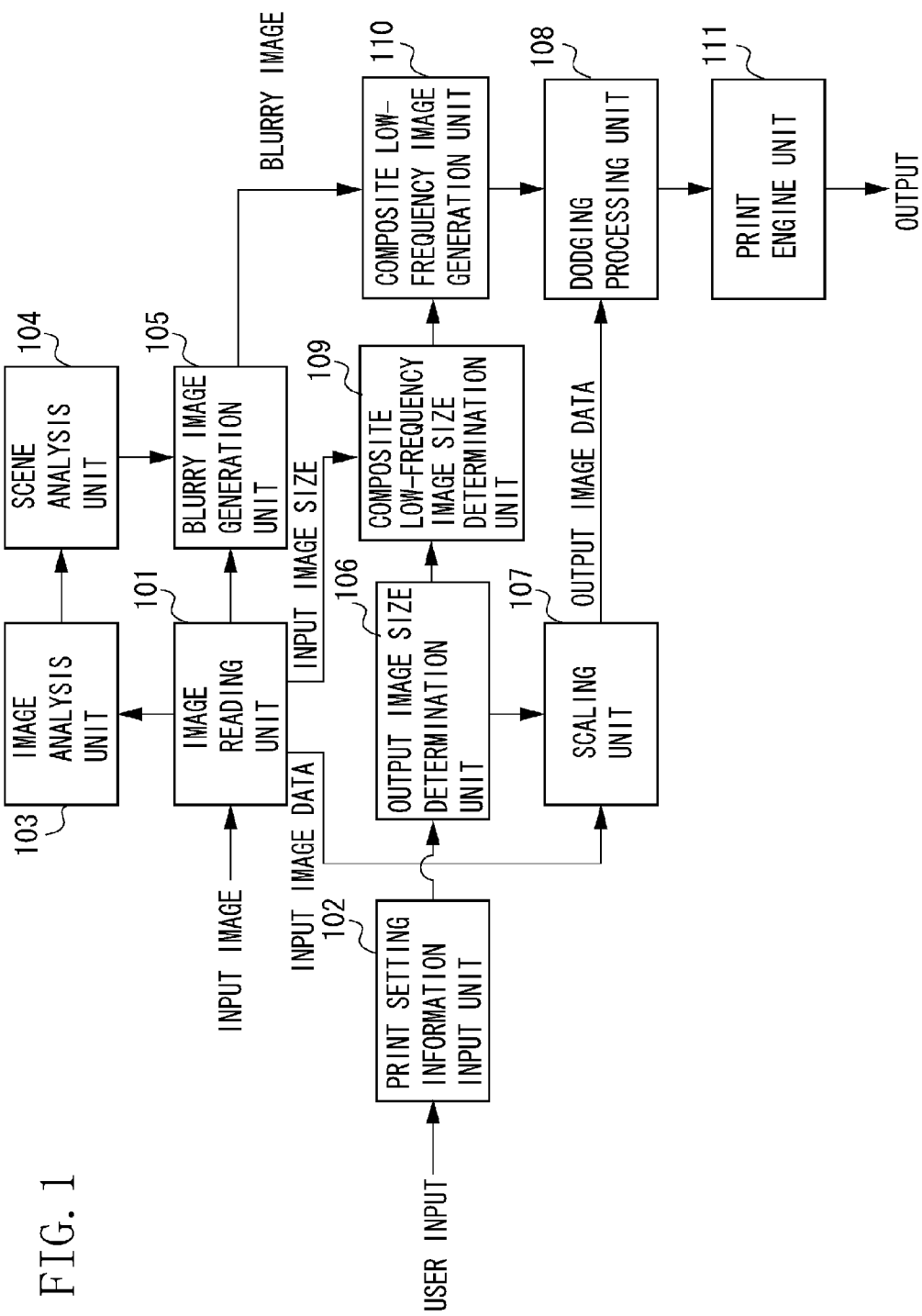
FIG. 1 is a block diagram illustrating processing according to a first exemplary embodiment.

FIG. 1 is a block diagram illustrating processing units according to the present exemplary embodiment. The processing flow will now be described in more detail referring FIG. 1 and where necessary flowcharts for each of the component units. The program codes and various tables for realizing the processes in the below-described flowcharts are stored in the ROM 203. When the printer 200 is operated, these program codes and tables are read in the RAM 202.

For simplification, in the present exemplary embodiment, processing will be described in which the number of blurry images (low-frequency images) used to form the composite low-frequency image is limited to two. However, the present invention is not limited thereto. The number of blurry images used to form the composite low-frequency image may be three or more.

First, a storage medium, such as a memory card 209, including input image data (e.g., 2,000 pixels wide and 3,000 pixels high), which a user wishes to print, is inserted into the external interface 206 of the printer 200. The input image data is then input to an image reading unit 101. This image reading unit 101 decompresses compressed data as necessary, and displays thumbnail image data on the display in the UI 205.

Figure 3:
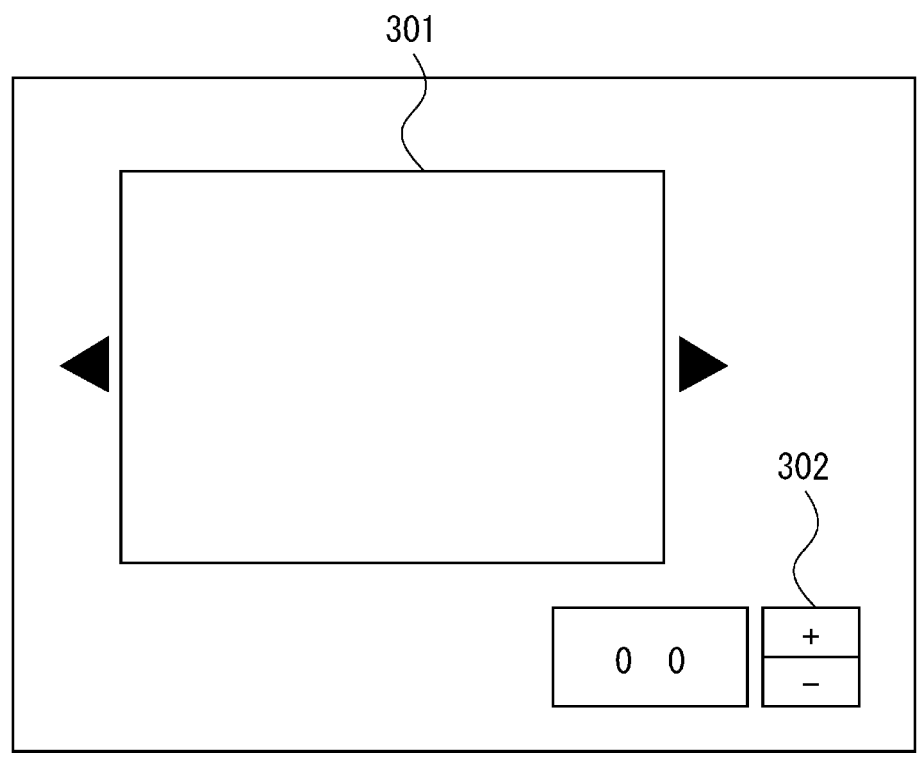
FIG. 3 illustrates a user interface (UI) for setting print setting information.

FIG. 3 illustrates an example of a thumbnail image data in a displayed sate. An area 301 is the area in which a thumbnail is displayed.

Next, the user selects an image that the user wishes to print via a print setting information input unit 102 while referring to the displayed thumbnail image in the area 301. Further, the user specifies the number of printouts using a +/− key 302 (or a +/− key included in the UI 205) illustrated in FIG. 3.

Figure 4:
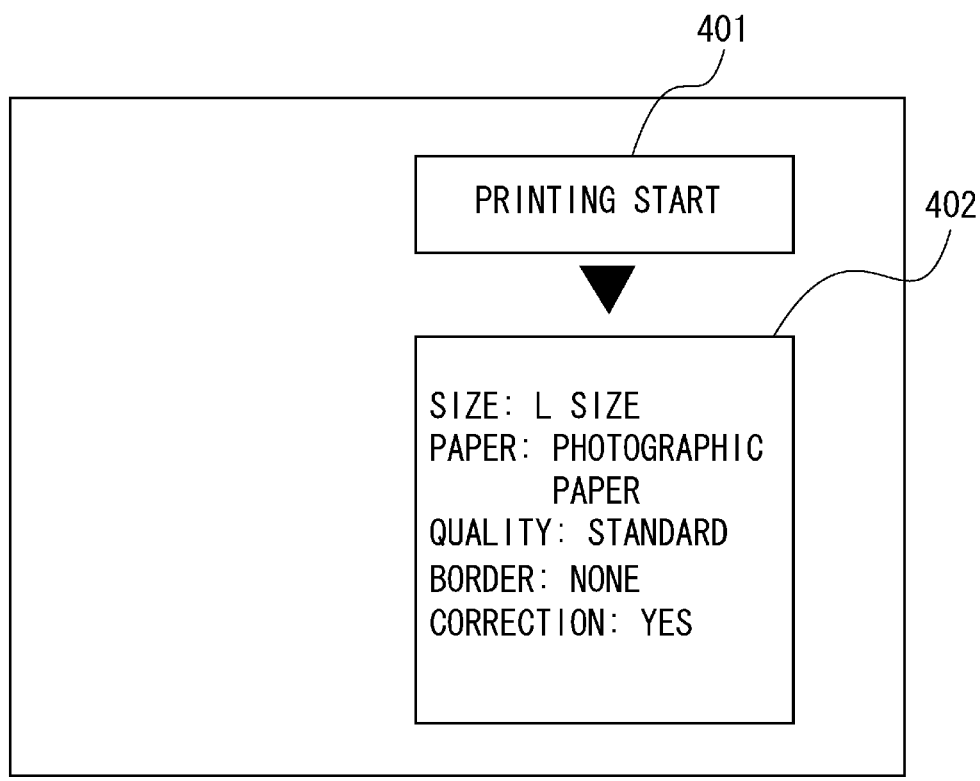
FIG. 4 illustrates a UI for setting print setting information.

When the image and the printout number have been specified, next, using a UI like that illustrated in FIG. 4, the print conditions are input. Examples of the main print conditions include the size and type of the printing paper, and the setting of print quality and presence of a border. When the print conditions have been input, a button 401 is pressed to start print processing. When print processing starts, the input image is input to an image analysis unit 103, and image analysis processing is performed by the image analysis unit 103.

Examples of representative image analysis processing include object extraction processing for extracting a main object (e.g., a person's face) from the input image, and calculation of an image characteristic level such as an average luminance value, an average chroma saturation value and the like of all the input image data.

Concerning the extraction processing of the main object, such processing is well known in various documents. The processing method from any of these methods may be used here. Thus, a detailed description of such processing is omitted.

Next, the image analysis result is input to a scene analysis unit 104, and analysis processing of a captured scene is performed by the scene analysis unit 104. Analysis of the captured scene includes analysis such as whether the captured scene is a landscape scene, a night scene, or a snap shot. However, in the present exemplary embodiment, determination of an exposure state of the image will be especially described.

If extraction of the main object by the image analysis unit 103 is successful, the average luminance of a main object area can be calculated by referring to the main object area in the input image data. It can be determined whether the input image data is at a correct exposure or in an underexposed state by comparing the calculated average luminance with a predetermined average luminance value of the main object at a correct exposure.

In exposure determination performed by the scene analysis unit 104 as described above, if it is determined that the input image data is at a correct exposure, the input image data is subjected to an ordinary image processing flow (not illustrated), and to a print processing.

If it is determined that the input image data is underexposed, the input image is input to the blurry image generation unit 105. Then, a plurality of blurry images having different blurriness levels are generated by the blurry image generation unit 105.

Figure 5:
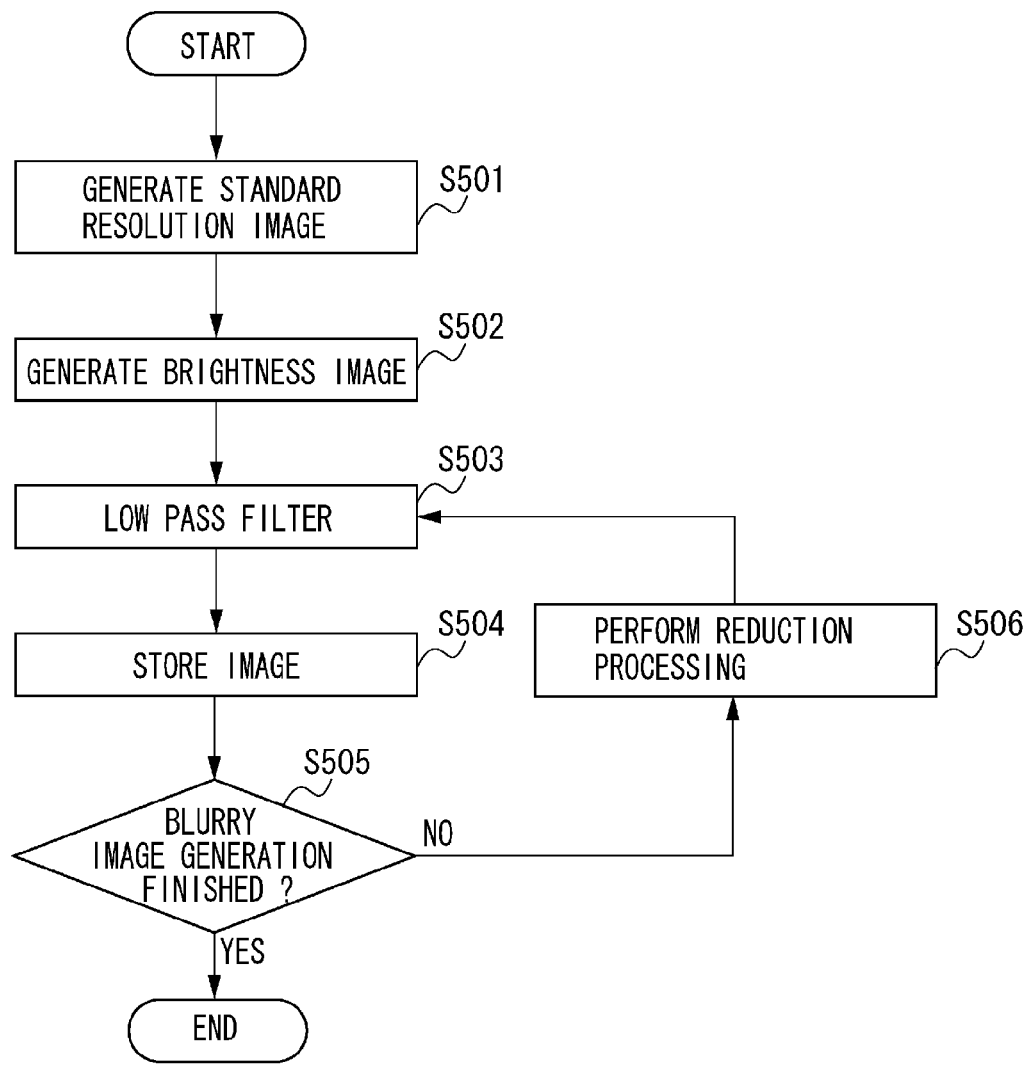
FIG. 5 is a flowchart illustrating a processing flow of a blurry image generation unit 105.

FIG. 5 is a flowchart illustrating a flow performed in the blurry image generation unit 105. In the blurry image generation flow according to the present exemplary embodiment, first, in step S501, the resolution of the input image (e.g., an RGB color image) is converted into a predetermined standard resolution. The standard resolution is a predetermined resolution, in which the width and the height of the input image are changed so that the surface area corresponds to (800×1,200 pixels), for example. Although examples of this resolution conversion include various interpolation methods such as nearest interpolation and linear interpolation, any interpolation method can be used here.

Next, in step S502, the size-converted RGB color image is converted into a brightness image using a known brightness color difference conversion formula. Then, in step S503, the size changed image data is subjected to a predetermined low pass filter. The resultant composite low-frequency image is stored in a RAM area different from that of the brightness image. Although there are various types of low-pass filters, the present exemplary embodiment will be described based on the assumption of using a 5×5 smoothing filter like that illustrated below as an example.

$$F = \frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \quad \text{Formula 1}$$

The blurry image generation method according to the present exemplary embodiment is not limited to this smoothing filter. For example, a Gauss filter, a known infinite impulse response (IIR) or a finite impulse response (FIR) filter may be used as coefficients of the above rectangular filter.

To generate a blurry image having a different blurriness level, in the present exemplary embodiment, in step S506, the image data, which has been subjected to the low-pass filter, is reduced to a size having a predetermined reduction ratio (e.g., 1/4). The processing then returns to step S503, and filter processing is similarly performed.

Figure 6:
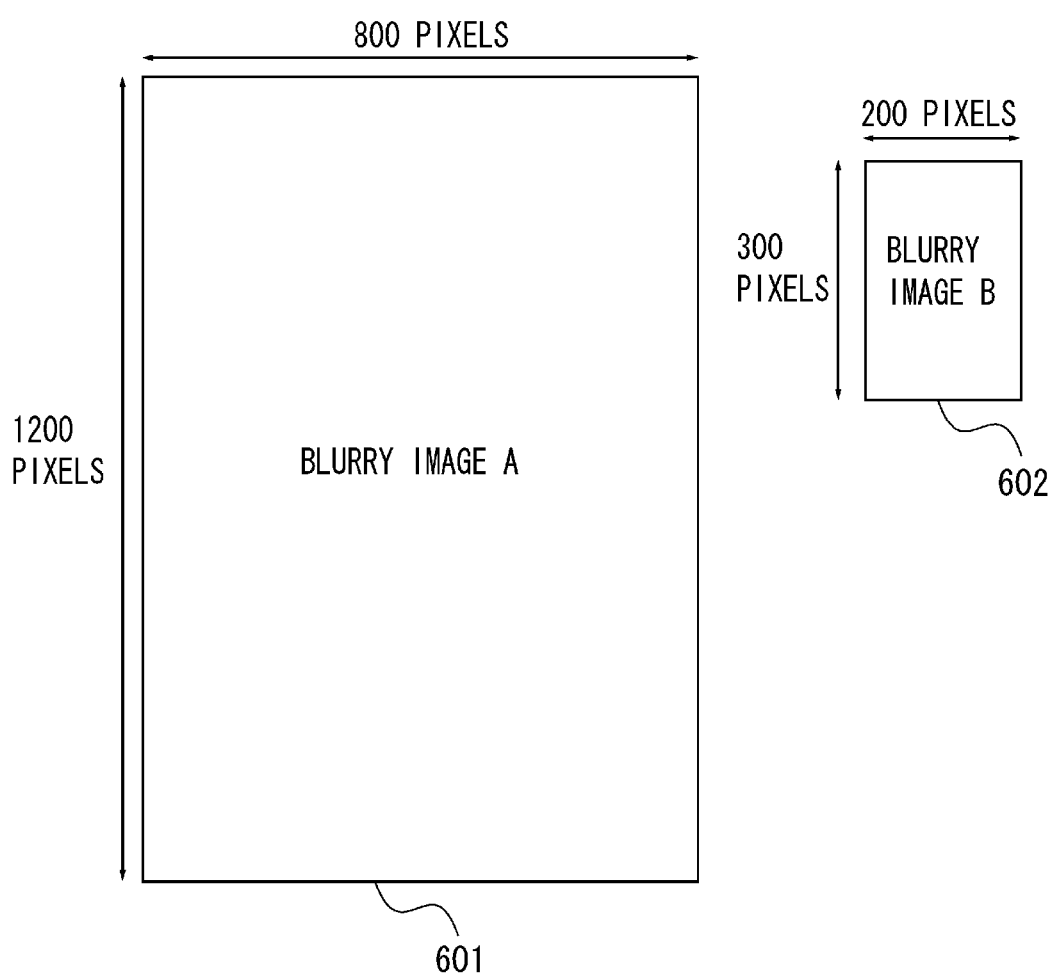
FIG. 6 illustrates sizes of generated blurry images.

The above-described reduction and low-pass filtering steps are repeated for as many times as is necessary to generate a plurality of blurry images having different image sizes. For simplification, in the present exemplary embodiment, as illustrated in FIG. 6, two sizes of blurry images are generated and stored in the RAM 202.

Blurry image B is ¼ the size of blurry image A. However, since blurry image B is subjected to the same filtering as blurry image A, if blurry image B is changed in size to the same image size as blurry image A, blurry image B will have a stronger blurriness level than blurry image A.

Thus, in the present exemplary embodiment, blurry images are generated by converting the resolution of an input image into a predetermined standard resolution, and by using a low pass filter of which a filter size is fixed with respect to the standard resolution. Therefore, even if the size of the input image is variously changed, the blurriness level of the blurry images can be kept constant. Further, since the filter size is always constant, the processing amount during blurry image generation can also be kept constant.

Further, by sequentially reducing the image and performing filter processing, there is an advantage that a plurality of images having different blurriness levels can be generated at a low calculation amount.

Further, in the present exemplary embodiment, while an example is described in which an image that is subjected to a low-pass filter is sequentially reduced, and the reduced image is then again subjected to the low-pass filter, the present exemplary embodiment is not limited to this. For example, the scope of the present invention also includes cases in which a standard resolution image generated in step S501, which is not subjected to the low-pass filter, is sequentially reduced to a predetermined size, and then subjected to the low-pass filter. Thus, the scope of the present invention also includes cases of generating a plurality of reduced images that have only been subjected to the low-pass filter once.

Returning to FIG. 1, the size of the output image is determined by a output image size determination unit 106 based on the print setting information that the user set via the print setting information input unit 102. The size of the output image can be determined based on the stored information about the width and the height for each printing paper size and the resolution when performing printing. Here, "print setting information" refers to the paper size for printing the input image. For example, when printing at a resolution of 300 dpi on a four-inch wide, six-inch high sheet of paper, the required output image size is 1,200×1,800 pixels.

When the output image size is determined, the determined output image size information and the input image data are input to the scaling unit 107, and the scaling unit 107 changes the input image data into the output image size. The changed image data is input to the below-described dodging processing unit 108, and the dodging processing unit 108 performs dodging processing.

Next, the output image size information is input to the composite low-frequency image size determination unit 109, and the composite low-frequency image size determination unit 109 determines the size of the composite low-frequency image to be used during the dodging processing.

Figure 7:
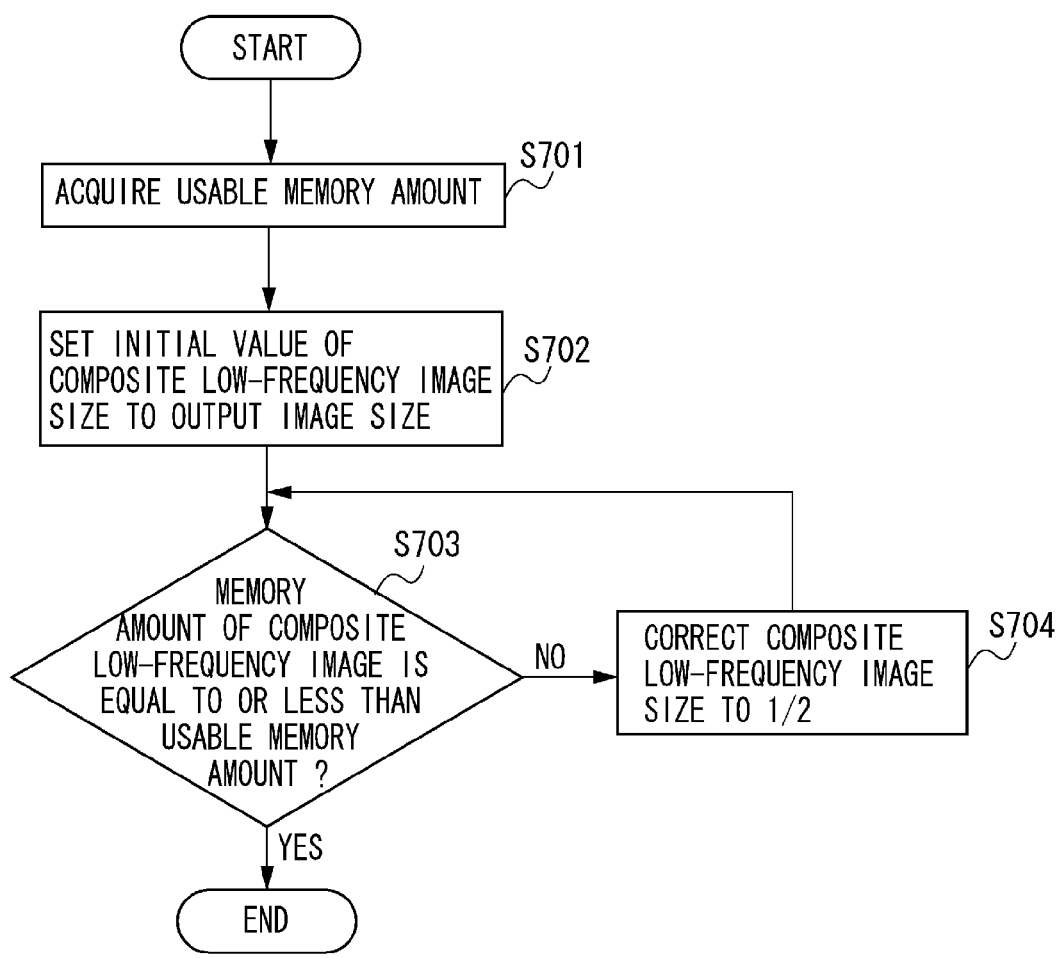
FIG. 7 is a flowchart illustrating a processing flow of a composite low-frequency image size determination unit 109.

FIG. 7 is a flowchart illustrating a processing flow in the composite low-frequency image size determination unit 109. First, in step S701, the composite low-frequency image size determination unit 109 acquires a usable memory amount M (bytes) for storing the generated composite low-frequency image. The usable memory is the RAM 202 or the secondary storage device 204.

The usable memory amount can be acquired using a system information acquisition function included in the operating system (OS) running on the printer 200, or can be a predetermined value determined according to the system. In the present exemplary embodiment, an example will be described in which the acquired value M is 1,048,576 bytes (1,024 kB).

Next, in step S702, an initial value of the composite low-frequency image size is initialized as the output image size calculated by the output image size determination unit 106. Specifically, in the above example, the width and the height of the composite low-frequency image are respectively set as 1,200 pixels and 1,800 pixels.

In step S703, it is determined whether the composite low-frequency image generated with the width and the height calculated in step S702 can be stored in the M bytes of the usable memory amount acquired in step S701. In other words, it is determined whether the memory amount of the generated composite low-frequency image exceeds the usable memory amount. In the present exemplary embodiment, 2,160,000 bytes of memory are required to store the composite low-frequency image having 1,200×1,800 pixels. However, since M=1,048,576, the generated composite low-frequency image cannot be stored with its current size (NO in step S703).

Thus, in step S704, processing is performed to reduce the composite low-frequency image resolution. In the step S704 according to the present exemplary embodiment, especially, the current composite low-frequency image width and height are respectively halved. Therefore, in step S704 of the present exemplary embodiment, by reducing the output image size by $\frac{1}{2}^N$ (N is a natural number), the advantageous effect that it is easier to access the composite low-frequency image during the below-described dodging processing is produced. In this example, by halving the size of the 1,200×1,800 pixels, the composite low-frequency image size becomes 600×900 pixels.

In step S703, it is again determined whether the data amount of the composite low-frequency image is equal to or less than M bytes. This time, since 600×900=540,000, the data amount is less than Mbytes (less than the usable memory amount) (YES in step S703). Consequently, the size of the composite low-frequency image is determined and processing is finished.

Returning to FIG. 1, the size of the composite low-frequency image determined by the above processing is input to the composite low-frequency image generation unit 110. Using the two blurry images 601 and 602 generated by the blurry image generation unit 105, the composite low-frequency image generation unit 110 generates a composite low-frequency image having 600×900 pixels.

Figure 8:
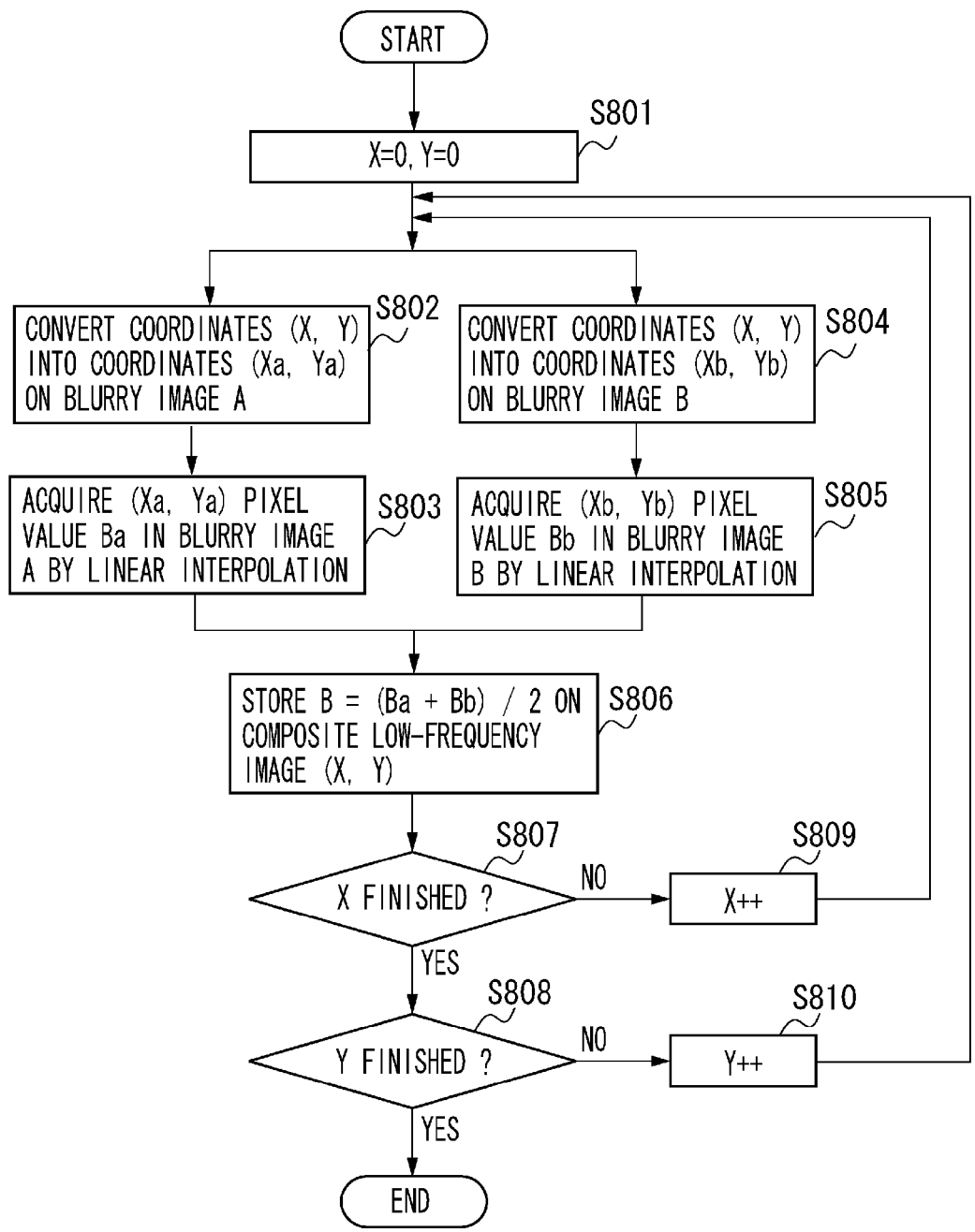
FIG. 8 is a flowchart illustrating a processing flow of a composite low-frequency image generation unit 110.

FIG. 8 is a flowchart illustrating a processing flow performed in the composite low-frequency image generation unit 110 according to the present exemplary embodiment.

First, in step S801, a pixel position X, Y of the composite low-frequency image is initialized. Next, in step S802, the position (Xa, Ya) on the blurry image A601 corresponding to the position (X, Y) on the composite low-frequency image is calculated. Here, the blurry image is 800×1,200 pixels. In the present exemplary embodiment, the position can be calculated as follows.

$$Xa = X \times 800 \div 600$$

$$Ya = Y \times 1{,}200 \div 900$$

Using the calculated (Xa, Ya), in step S803, the pixel value Ba of the same coordinate position in the blurry image A 601 is acquired. At this stage, because Xa and Ya may not necessarily be integers, if there is a fractional part, the pixel value Ba is calculated using known linear interpolation.

While any known interpolation method may be used, if nearest interpolation is used, block-shaped high-frequency noise is generated on the composite low-frequency image, which can cause the image quality in the subsequent dodging correction to deteriorate. Thus, here, nearest interpolation will not be used.

In steps S804 and S805, similar interpolation processing (pixel interpolation) is performed on the blurry image B602. Consequently, a pixel value Bb of the position (Xb, Yb) in the blurry image B is acquired.

Then, in step S806, the pixel value B of the position (X, Y) in the composite low-frequency image is calculated by a simple averaging process, and the calculated value is stored in the ROM 203 or the secondary storage device 204. The above processing is performed on all of the pixels (600×900 pixels) to generate the composite low-frequency image.

Returning to FIG. 1, using the output image generated by the scaling unit 107 and the composite low-frequency image data generated by the composite low-frequency image generation unit 110, dodging processing is performed by the dodging processing unit 108.

Figure 9:
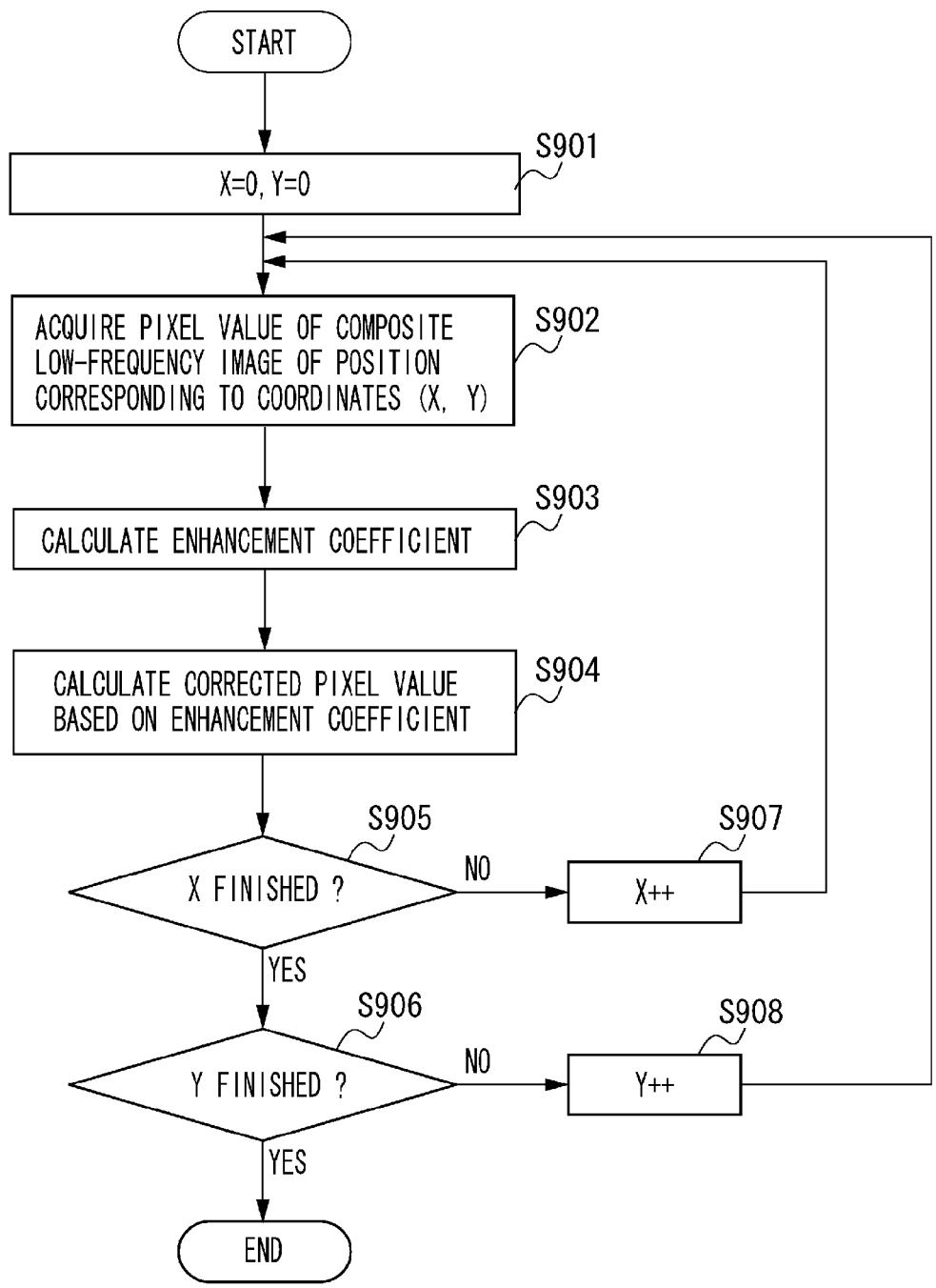
FIG. 9 is a flowchart illustrating a processing flow of a dodging processing unit 108.

FIG. 9 is a flowchart illustrating a processing flow of a dodging process according to the present exemplary embodiment.

First, in step S901, the coordinate positions (X, Y) in the output image generated by the scaling unit 107 are initialized.

Next, in step S902, the coordinate positions (Xz, Yz) on the composite low-frequency image generated by the composite low-frequency image generation unit 110 corresponding to the coordinates (X, Y) are calculated. As described above, the size of the composite low-frequency image is generated as $1/(2^N)$ (N is a natural number) the size of the output image. Therefore, the coordinate positions (Xz, Yz) can be calculated just by performing the following bit shifts.

$$(Xz, Yz) = (X >> N, Y >> N)$$

In the above equation, the X>>N means that the value stored in the variable X shifts by N bits to the right. In the above example, since the composite low-frequency image is calculated as ½ the size of the output image size, in the above equation, N may be 1.

Thus, calculating the coordinate positions by only bit shifting leads to a reduction in processing costs. Especially, in a hardware configuration in which the CPU processing capability is limited, such as a printer main unit, it is a very effective technique.

After the pixel value of the composite low-frequency image of the coordinate positions (Xz, Yz) has been acquired, in step S903, an enhancement coefficient K for performing the dodging process is calculated.

In the present exemplary embodiment, any dodging method that has already been discussed in known documents may be used. However, as an example, in the present exemplary embodiment, the enhancement coefficient K is determined based on the following equation.

$$K = g \times (1.0 - (B(Xz, Yz)/255))$$

In the above equation, B(Xz, Yz) is a pixel value (0 to 255) of the composite low-frequency image at coordinates (Xz, Yz), and "g" denotes a predetermined constant.

In the above equation, when the pixel value of the composite low-frequency image is dark, the enhancement coefficient K increases, so that the pixel value is corrected to become brighter. Conversely, when the pixel value of the composite low-frequency image is bright, the enhancement coefficient K decreases, so that the correction amount of the pixel value is smaller.

Using this enhancement coefficient K, in step S904, dodging correction is performed by multiplying each color component for each pixel value of the output image by the enhancement coefficient K. If the output image holds an RGB component, each of the RGB components may be multiplied by the enhancement coefficient K. Alternatively, the RGB components may be converted into brightness color difference components (YCbCr), and only the Y component may be multiplied by the enhancement coefficient K.

In steps S905 to S908, the above processing is performed on all of the pixel values of the output image generated by the scaling unit 107, so that the dodging processing using the composite low-frequency image can be performed.

Obviously, in addition to using the above enhancement coefficient, no matter what dodging method is used, the resultant data will be included in the scope of the present invention.

Next, the dodging-processed image data is input to a printer engine unit 111, and predetermined color conversion processing is performed by the printer engine unit 111. Then, the resultant image data is converted into CMYK components, which are the ink colors, and known pseudo gradation processing such as error diffusion is performed. Then, the resultant image data is recorded on printing paper.

As described above, according to the present exemplary embodiment, first the input image is converted into a standard resolution, and then the converted image is subjected to a low-pass filter. Therefore, regardless of the resolution of the input image, the blurriness level and the processing speed when generating the blurry image can be kept constant.

Specifically, according to the present exemplary embodiment, the number of multiplications in the filter calculation when the first blurry image is generated is 5×5×800×1,200 times. If, as in the present exemplary embodiment, to obtain a similar blurriness level without using the above standard resolution image, the filter size needs to be set 2.5 times greater, to 13. In this case, the number of multiplications becomes 13×13×2,000×3,000 times. Therefore, according to the present exemplary embodiment, the number of multiplications can be reduced to about $\frac{1}{42}$.

The resolution of the composite low-frequency image is determined according to the output resolution determined based on the print setting information input by the user. Further, the processing for generating the composite low-frequency image is performed only for the number of pixels at the determined resolution. Therefore, the composite low-frequency image can be generated with the minimum necessary amount of processing.

In addition, in the present exemplary embodiment, blurry images having different sizes are stored in a memory by repeatedly subjecting a reduced standard resolution image to a low-pass filter. In the processing for generating the composite low-frequency image, the pixel value corresponding to each pixel position in the composite low-frequency image is acquired from each blurry image, and the respective pixel values acquired from each blurry image are composited. Consequently, the present exemplary embodiment has the advantage that the processing amount can be kept to the minimum necessary level even for linear interpolation calculation, which has a large calculation cost.

Specifically, according to the present exemplary embodiment, since the size of the composite low-frequency image is 600×900 pixels due to a restriction of the memory capacity, the number of linear interpolations is 600×900×2 times. On the other hand, when a composite low-frequency image is generated with the same size as the input image, the number of linear interpolations is 2,000×3,000×2 times. If these numbers are compared, it can be seen that the number of interpolations in the present exemplary embodiment is reduced to $\frac{1}{11}$.

By reducing the processing amount of the composite processing as a result of the above-described configuration, for example, a remarkable advantageous effect is produced in which rapid dodging processing can be realized even for a hardware configuration having a restricted CPU calculation capability, such as an inkjet printer.

Further, since the resolution of the composite low-frequency image is determined based on the usable memory amount, the present exemplary embodiment can be easily applied even in hardware having little memory resources.

In addition, by generating a composite low-frequency image having a resolution that is $\frac{1}{2^N}$ the resolution of the output image, when performing the dodging processing, there is the advantage that the composite low-frequency image can be easily accessed.

In the first exemplary embodiment, a case has been described in which the resolution of the composite low-frequency image is determined using the printing paper size from the print setting information input by the user. However, the present invention is not limited to this. For example, the resolution of the composite low-frequency image can also be determined according to the print quality from the print setting information set via a UI 402 illustrated in FIG. 4.

Figure 10:
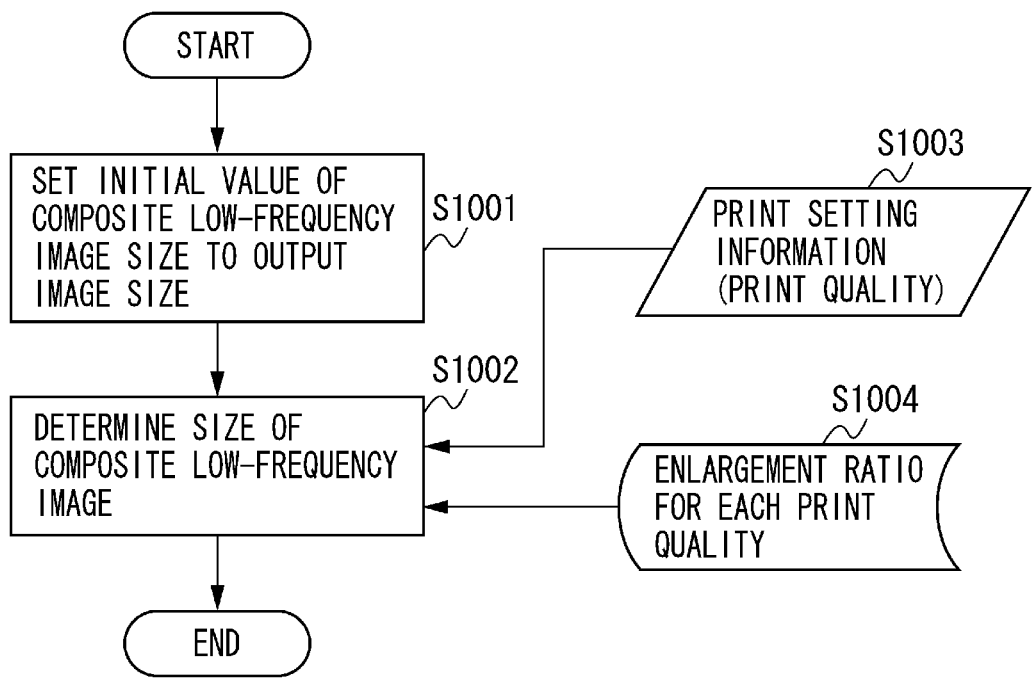
FIG. 10 is a flowchart illustrating a processing flow of a composite low-frequency image size determination unit 109 according to a second exemplary embodiment.

FIG. 10 is a flowchart illustrating a processing flow performed in the composite low-frequency image size determination unit 109 according to the present exemplary embodiment. In this exemplary embodiment, similar to the first exemplary embodiment, an example will be described on assumption that the output resolution is 1,200×800 pixels.

First, in step S1001 of FIG. 10, similar to the first exemplary embodiment, the initial value of the composite low-frequency image size is set to the output image size determined by the output image size determination unit 106.

Next, in step S1002, the final size of the composite low-frequency image is determined using information 1003 about the print quality and an enlargement rate table 1004 of the composite low-frequency image pre-set for each print quality from the print setting information input via the print setting information input unit 102.

Figure 12:
FIG. 12 is a table illustrating an enlargement rate of a composite low-frequency image size based on print quality.

In this example, the enlargement rate table for each print quality is a table like that illustrated in FIG. 12.

In step S1002, if image quality priority is set in the print setting information, by multiplying the output image size in the initial state by the enlargement rate of 1.0 obtained from the table of FIG. 12, the composite low-frequency image size is determined as the same size as the output image size. In step S1002, if the print quality is set as speed priority, since the composite low-frequency image needs to be rapidly generated, the size of the composite low-frequency image is generated 0.5 times that for image quality priority, specifically, in 600×900 pixels. In this case, since the number of pixels is ¼ that for image quality priority, the composite processing is four times faster.

If the print quality designation is set to "standard", which is an intermediate quality between speed priority and image quality priority, referring to the above enlargement table 1201, the size of the composite low-frequency image is generated at 0.75 times, which is an intermediate size between speed priority and image quality priority. Consequently, image processing can be performed, which balances image quality and speed. Similarly, among the print setting information, the size of the composite low-frequency image can also be determined based on the paper type.

Figure 11:
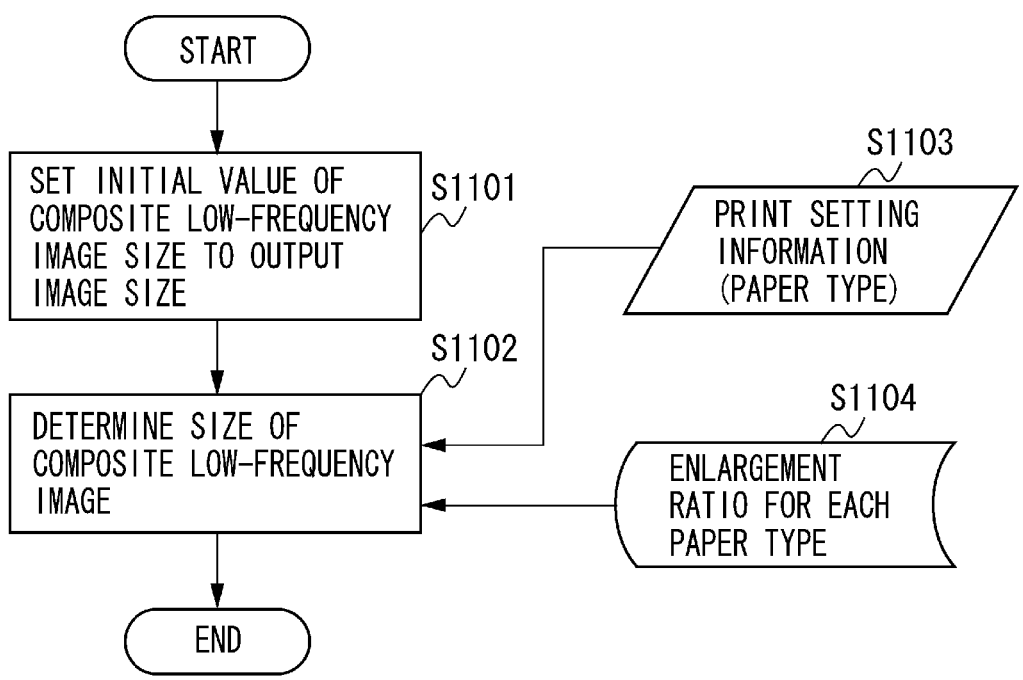
FIG. 11 is a flowchart illustrating a processing flow of a composite low-frequency image size determination unit 109 according to the second exemplary embodiment.

In this case, the processing flow of the composite low-frequency image size determination unit 109 is as illustrated in FIG. 11. In step S1101, the size of the composite low-frequency image is determined using a paper type 1103 included in the print setting information input by the user and an enlargement rate table 1104 predetermined for each paper type.

The enlargement rate table at this time is illustrated in FIG. 13. As illustrated in FIG. 13, when "photographic paper", for which a high image quality is desirable, is set for the type of printing paper, a composite low-frequency image having the same size as the output resolution is generated. Further, for plain paper, the composite low-frequency image is generated at 0.5 times the size, and for matte paper, for which an intermediate quality level is desirable, the composite low-frequency image is generated at 0.75 times the size.

As described above, according to the present exemplary embodiment, by determining the size of the composite low-frequency image using especially the print quality and the paper type from among the print setting information set by the user, a balance between processing speed and image quality can be appropriately controlled.

Further, the above-described specific values, print quality levels, and paper types are all merely examples. Obviously, the scope of the present invention includes cases in which these values, print quality levels, and paper types are set differently.

In the dodging correction processing described in the first and second exemplary embodiments, the size of the composite low-frequency image is generated as $\frac{1}{2^N}$ that of the output image size. Consequently, by bit shifting the pixel position on the output image, the composite low-frequency image is easily accessed.

More specifically, in the first exemplary embodiment, an example has been described for printing at 300 dpi on a four-inch wide, six-inch high sheet of paper. In such a case, the output image size is 1,200×1,800 pixels, and the generated composite low-frequency image size is 600×900 pixels based on the usable memory amount. In the first exemplary embodiment, when performing dodging processing on each pixel of the output image using the above-described composite low-frequency image, the composite low-frequency image is accessed by calculating the output image position shifted one bit to the right to speed up the processing.

Figure 14:
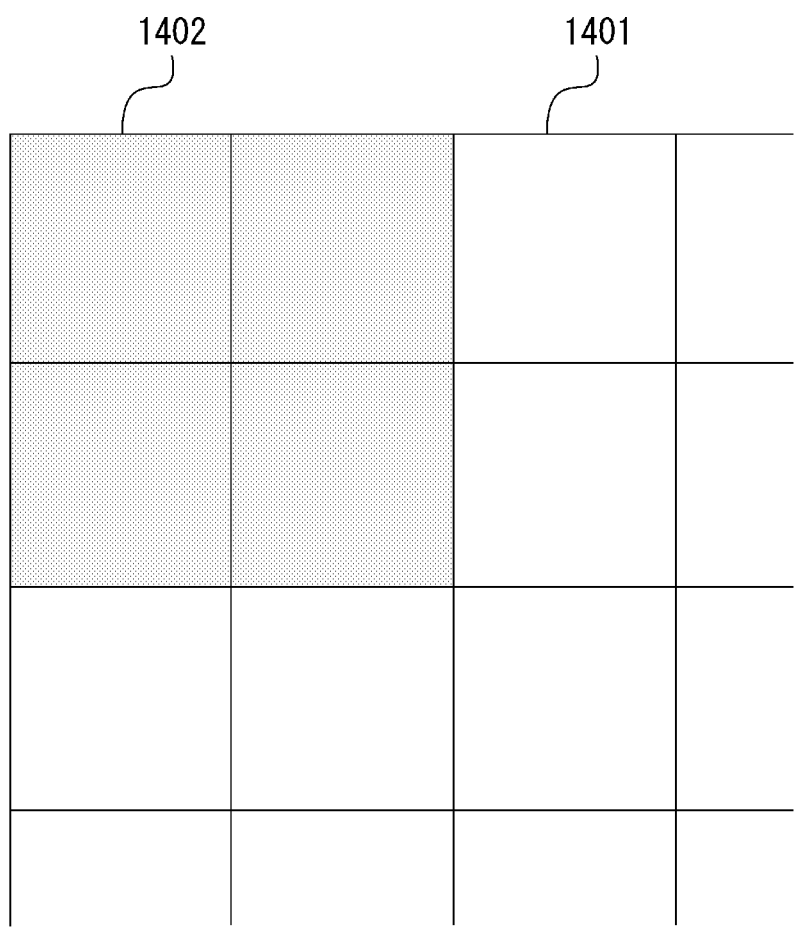
FIG. 14 illustrates a relationship between pixels of an output image and a composite low-frequency image.

Therefore, as illustrated in FIG. 14, if dodging processing is performed on each pixel on the output image 1401, in the above example, a two pixel square area 1402 is subjected to dodging processing at the same enhancement coefficient.

However, this rectangular area (in this example, a two pixel square area) to be processed with the same enhancement coefficient may be recognized as block-shaped noise depending on the size occupying in the print product. Therefore, in the present exemplary embodiment, this problem is solved by using the flow performed by the composite low-frequency image size determination unit 109 to be that illustrated in FIG. 15.

Figure 15:
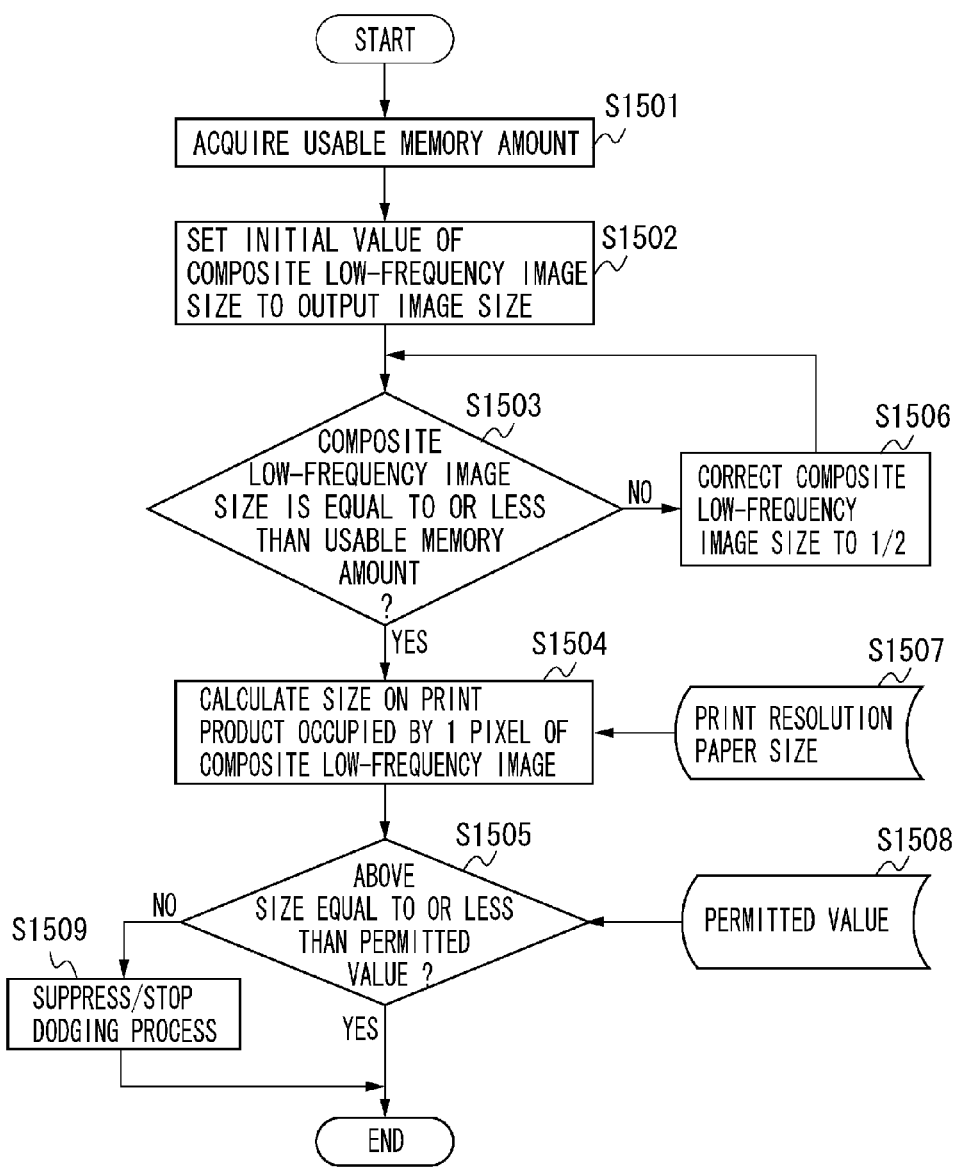
FIG. 15 is a flowchart illustrating a processing flow of a composite low-frequency image size determination unit 109 according to a third exemplary embodiment.

In FIG. 15, similar to the first exemplary embodiment, in step S1501, the usable memory amount is acquired. In step S1502, the initial value of the composite low-frequency image is set. Then, in steps S1503 and S1506, the size of the composite low-frequency image is halved based on the usable memory amount, similar to steps S703 and S704 of FIG. 7 in the first exemplary embodiment.

Next, in the present exemplary embodiment, in step S1504, the area occupied on the print medium by one pixel of the composite low-frequency image having the size calculated based on the printing resolution and information 1507 about the printing paper is calculated. For example, in the above example, if the printing resolution is 300 dpi, a short side L (mm) of the output resolution two pixel square area can be calculated as follows. In this calculation, one inch is assumed to be 25.4 mm.

$$L=(2/300)\times 25.4=0.17$$

Specifically, in this example, this means that in a square area of 0.17 mm of a sheet of printing paper of four inches wide and six inches high, the dodging enhancement coefficient is the same.

In step S1505, the calculated L value is compared with a pre-set permitted value. If the calculated L value exceeds the permitted value (NO in step S1505), the processing proceeds to step S1509. In step S1509, the dodging process is suppressed or stopped. Consequently, image damage in the print product can be suppressed.

Based on experiments performed by the applicant of the present application, hardly any image damage could be observed for a permitted value of 0.5 mm or less on the printing paper. A slight amount of damage was confirmed at a permitted value of about 0.5 to 1.0 mm, and damage was confirmed at a permitted value of 1.0 mm or more. Therefore, in the present invention, it is preferred to set the permitted value at about 0.5 to 1.0 mm. In the present exemplary embodiment, as an example, the permitted value is set at 0.5 mm. In the above example, since L=0.17 mm<0.5 mm, in step S1505, it is determined that dodging processing can be performed (YES in step S1505).

On the other hand, if the usable memory amount acquired in step S1501 is 35,000 bytes, the 600×900 composite low-frequency image cannot be held (NO in step S1503). Therefore, the processing passes through step S1506 twice, and the final size of the composite low-frequency image is determined as 150×225 pixels. In this case, the dodging enhancement coefficient is the same for an eight pixel square area on the output image.

By calculating in a similar manner as described above, the eight pixel square area is found to be about an 0.68 mm square area on the printing paper. Since this exceeds the above-determined permitted value of 0.5 mm, in step S1509, the dodging processing is set so as to be suppressed or stopped.

Thus, according to the present exemplary embodiment, a lower limit (permitted value) of a level at which image damage cannot be observed on an actual print medium is pre-set for a size of the composite low-frequency image determined by the composite low-frequency image size determination unit 109. Consequently, in a low usable memory state, by suppressing or stopping dodging processing based on the paper size and the resolution, image damage can be suppressed.

In the present exemplary embodiments, examples of performing dodging processing have been described using a composite low-frequency image having only a brightness component. However, the present invention is not limited to this. For example, a composite low-frequency image may be generated for each RGB component, and dodging processing may be performed on each color component.

Figure 16:
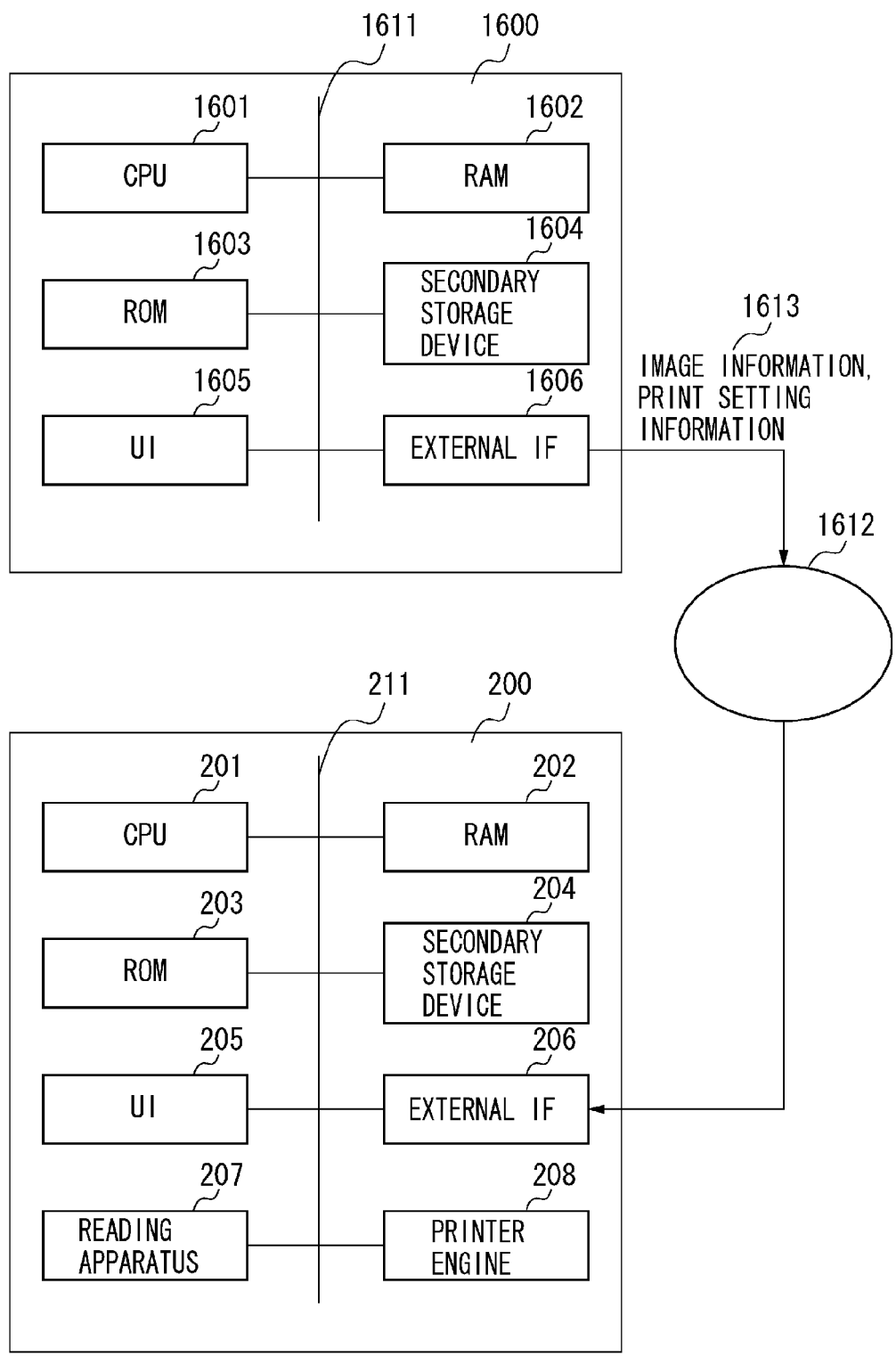
FIG. 16 is a block diagram illustrating a relationship between a printer and a client personal computer (PC) in another exemplary embodiment.

Further, in the above exemplary embodiments, although examples have been described in which the designation of the print setting information is input using a display device or a user interface built in the printer main unit, the present invention is not limited to this For example, as illustrated in FIG. 16, the printer 200 may be connected to a local area network (LAN) or wide area network (WAN) 1612, so that the user can input the print setting information on a client computer 1600, which is at a physically separated location from the printer.

Figure 17:
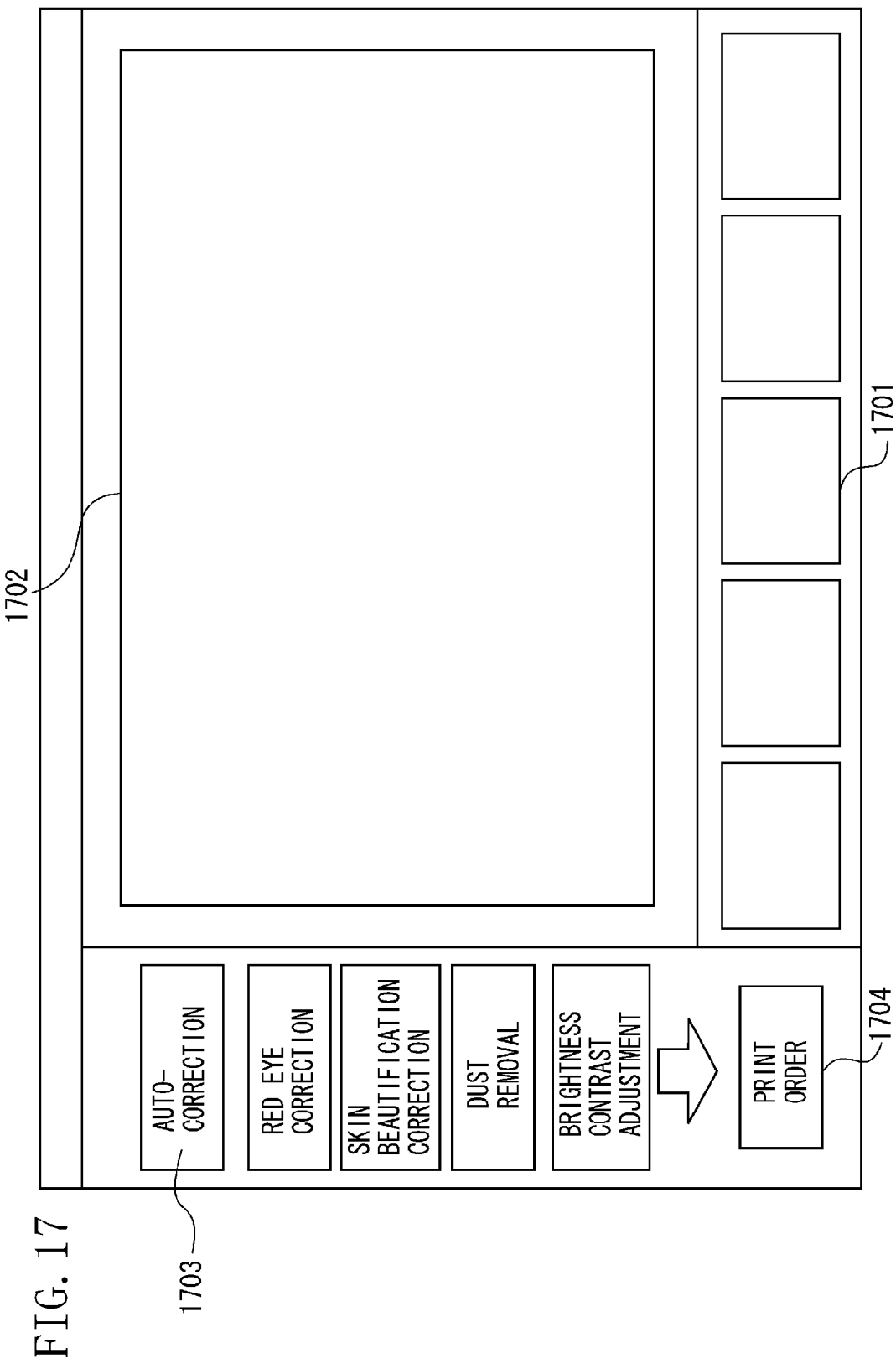
FIG. 17 illustrates a UI when performing a print order.

FIG. 17 illustrates an example of a UI for performing a print order, which is displayed on a display device such as a display included in a UI 1605. A thumbnail area 1701 displays thumbnails of candidate images, which will be the object of the print order. A display area 1702 displays a candidate image that is currently being focused on. A correction function button area 1703 is for specifying various correction functions for the image that is displayed in the display area 1702. The user proceeds to an order screen by performing correction using the correction function button on all of a group of a plurality of candidate images, and then selecting the print order button 1704 via a UI such as a mouse.

Figure 18:
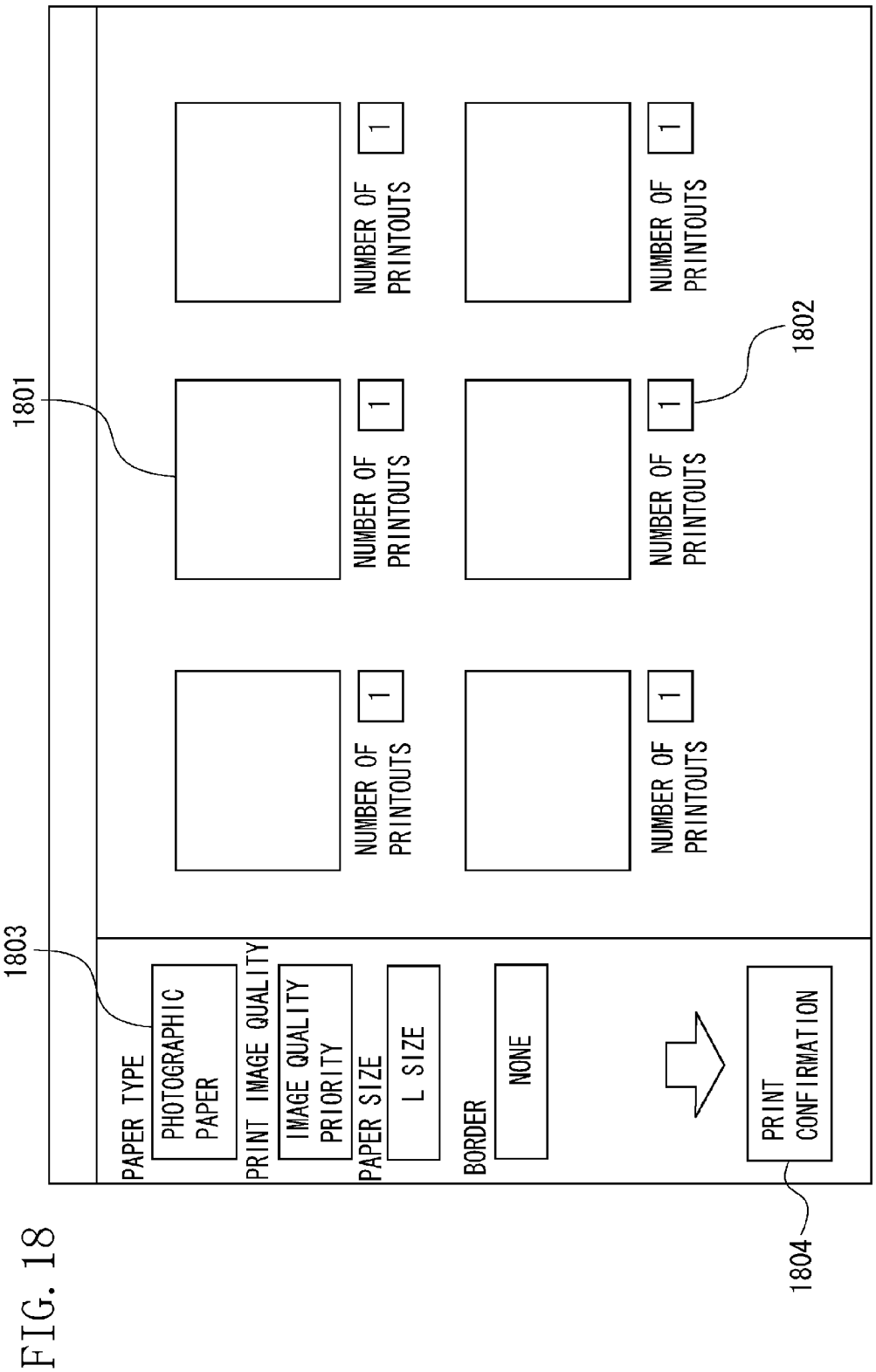
FIG. 18 illustrates a UI when performing a print order.

FIG. 18 illustrates the order screen. An area 1801 displays the group of candidate images selected on the previous screen. By inputting a number in a box 1802, the number of printouts for each image can be specified. Further, although, in the present example, a print setting information setting area 1803 is used to set the printing paper type, printing paper size, print quality, and the presence of a border, the present invention is not limited to this.

By selecting an order confirmation button 1804, the print setting information and image information 1613 are input to the printer 200 via the network 1612. Obviously, the scope of the present invention also includes cases in which image processing like that described in the above-described exemplary embodiments is executed in the printer.

Further, the image processing such as that described in the present exemplary embodiment may be performed in the printer based on the print setting information and the image information input as described above, or may be entirely performed by a client computer external to the printer. For example, all of the image processing, including the composite low-frequency image generation processing and the dodging processing, may be applied in the client computer 1600 illustrated in FIG. 16. Obviously, the present invention also includes cases in which the corrected image information is input to the printer via a network.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-152626 filed Jun. 26, 2009, which is hereby incorporated by reference herein in its entirety.

What is claimed is:

1. An image processing apparatus comprising:
   a blurry image generation unit configured to generate a plurality of blurry images having different blurriness levels from an input image;
   a calculation unit configured to calculate the number of pixels of a composite low-frequency image based on print setting information set for the input image;
   a generation unit configured to generate a composite low-frequency image having a number of pixels less than or equal to the calculated number of pixels by compositing the plurality of blurry images; and
   a processing unit configured to perform dodging processing on the input image using the generated composite low-frequency image.

2. The image processing apparatus according to claim 1, wherein the blurry image generation unit includes:
   a resolution conversion unit configured to convert the input image into an image having a predetermined resolution; and
   a filter processing unit configured to perform low-pass filtering on the image having the predetermined resolution.

3. The image processing apparatus according to claim 1, wherein the calculation unit is configured to calculate the number of pixels of an output image based on the print setting information and a printing resolution, and to calculate the number of pixels of the composite low-frequency image based on the calculated number of pixels of the output image.

4. The image processing apparatus according to claim 3, wherein the calculation unit is configured to, when a memory amount of the calculated composite low-frequency image having the calculated number of pixels exceeds a usable memory amount, calculate the number of pixels of the composite low-frequency image so that the memory amount of the composite low-frequency image is equal to or less than the usable memory amount.

5. The image processing apparatus according to claim 3, wherein the number of pixels of the composite low-frequency image is $1/2^N$ of the number of pixels of the output image.

6. The image processing apparatus according to claim 1, wherein the print setting information includes a size of a paper sheet to be used in printing of the input image, or a print quality of the input image, or a type of paper to be used in printing of the input image.

7. The image processing apparatus according to claim 1, wherein the generation unit is configured to, for each pixel of the composite low-frequency image, calculate using interpolation calculation a pixel value of each of the plurality of blurry images generated by the image generation unit corresponding to each pixel of the composite low-frequency image, and generate a composite low-frequency image by compositing a plurality of pixel values calculated by the interpolation calculation.

8. The image processing apparatus according to claim 1, wherein the processing unit is configured to correct the brightness of a pixel so that the darker the pixel of the composite low-frequency image corresponding to a pixel position of the input image is, the brighter the pixel at that pixel position of the input image becomes.

9. An image processing method comprising:
   generating a plurality of blurry images having different blurriness levels from an input image;
   calculating the number of pixels of a composite low-frequency image based on print setting information set for the input image;
   generating a composite low-frequency image having a number of pixels less than or equal to the calculated number of pixels by compositing the plurality of blurry images; and
   performing dodging processing on the input image using the generated composite low-frequency image.

10. A non-transitory computer-readable storage medium storing a computer program for causing a computer to perform a method comprising:
    generating a plurality of blurry images having different blurriness levels from an input image;
    calculating the number of pixels of a composite low-frequency image based on print setting information set for the input image;
    generating a composite low-frequency image having a number of pixels less than or equal to the calculated number of pixels by compositing the plurality of blurry images; and
    performing dodging processing on the input image using the generated composite low-frequency image.

* * * * *